United States Patent
Vivanco et al.

(10) Patent No.: US 11,051,222 B2
(45) Date of Patent: Jun. 29, 2021

(54) AUTOMATIC NEIGHBOR RELATIONSHIPS FOR A 5G AIR INTERFACE OR OTHER NEXT GENERATION NETWORK INTERFACES

(71) Applicants: AT&T Technical Services Company, Inc., Vienna, VA (US); AT&T Intellectual Property I, L.P., Atlanta, GA (US)

(72) Inventors: Daniel Vivanco, Ashburn, VA (US); Mark Stockert, San Antonio, TX (US); Slawomir Stawiarski, Carpentersville, IL (US)

(73) Assignees: AT&T INTELLECTUAL PROPERTY I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 16/416,964

(22) Filed: May 20, 2019

(65) Prior Publication Data

US 2020/0374770 A1 Nov. 26, 2020

(51) Int. Cl.
| | |
|---|---|
| *H04W 36/08* | (2009.01) |
| *H04W 74/08* | (2009.01) |
| *H04W 60/00* | (2009.01) |
| *H04W 76/27* | (2018.01) |
| *H04W 76/12* | (2018.01) |
| *H04W 72/04* | (2009.01) |
| *H04W 76/11* | (2018.01) |

(52) U.S. Cl.
CPC .......... *H04W 36/08* (2013.01); *H04W 60/00* (2013.01); *H04W 72/046* (2013.01); *H04W 74/0833* (2013.01); *H04W 76/11* (2018.02); *H04W 76/12* (2018.02); *H04W 76/27* (2018.02)

(58) Field of Classification Search
CPC ..... H04W 36/08; H04W 76/12; H04W 76/11; H04W 76/27; H04W 60/00; H04W 72/046; H04W 74/0833
See application file for complete search history.

(56) References Cited

U.S. PATENT DOCUMENTS

| | | | | |
|---|---|---|---|---|
| 9,294,970 | B1 * | 3/2016 | Sitaram | H04W 36/0083 |
| 2014/0228031 | A1 * | 8/2014 | Masini | H04W 36/0083 |
| | | | | 455/436 |
| 2016/0150453 | A1 * | 5/2016 | Narayanan | H04W 36/0061 |
| | | | | 455/436 |
| 2017/0359737 | A1 * | 12/2017 | Singh | H04W 16/14 |

* cited by examiner

*Primary Examiner* — Duc C Ho
(74) *Attorney, Agent, or Firm* — Amin, Turocy & Watson, LLP

(57) ABSTRACT

Beamforming techniques can improve base station transmission power and user equipment (UE) sensitivity reception. For example, beamforming can create a narrow beam, which can concentrate signal power in a much smaller region. Combined with base station (gNB) requests and UE location data, an accurate beam can be generated to cover a desired area. 5G base station broadcasts can utilize a globally unique cell identifier (e.g., physical cell identifier), and a locally unique cell identifier (e.g., new radio cell global identifier) to facilitate beamforming and mitigate handover failure.

20 Claims, 10 Drawing Sheets

AUTOMATIC NEIGHBOR RELATIONSHIPS FOR A 5G AIR INTERFACE OR OTHER NEXT GENERATION NETWORK INTERFACES

TECHNICAL FIELD

This disclosure relates generally to facilitating automatic neighbor relationships. For example, this disclosure relates to facilitating automatic neighbor relationships to overcome physical cell identifier conflicts for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to an automatic neighbor relationships is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
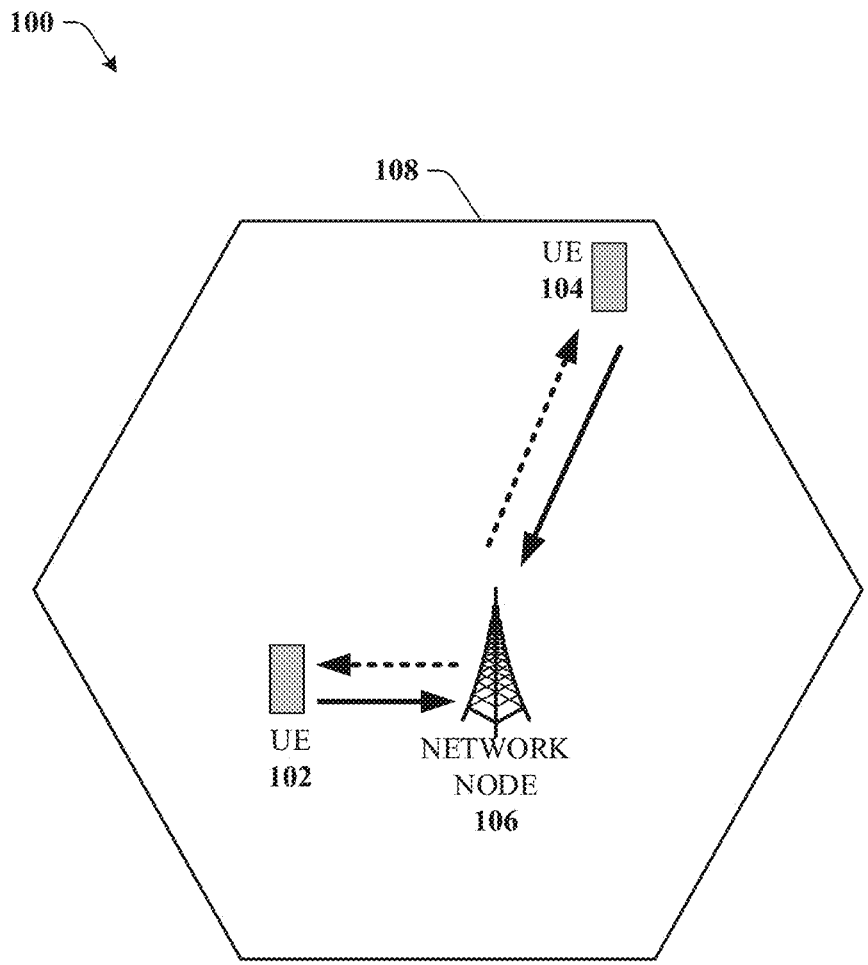
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system 204.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate automatic neighbor relationships for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate automatic neighbor relationships for a 5G network. Facilitating automatic neighbor relationships for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The 5G framework can take advantage of the massive throughput and low latency that new radio provides. Two solutions defined by 3GPP for 5G networks are: 5G non standalone (NSA), where the existing LTE radio access and core network (EPC) can be used as an anchor for mobility management and coverage to add the 5G carrier, and 2) 5G standalone (SA) where an all new 5G packet core can be introduced with several new capabilities built inherently into it. The SA architecture can comprise the 5G new radio (5G NR) and 5G core network (5GC). Network slicing, virtualization, multi-Gbps support, ultra low latency, and other such aspects can be natively built into the 5G SA packet core architecture.

The initial deployment of 5G services can be based on 5G NSA, also called option-3. The variants of option-3 are option-3 (e.g., traffic is split across 4G and 5G at eNB), option-3a (e.g., traffic is split across 4G and 5G at EPC (S-GW)), and option-3x (traffic is split across 4G and 5G at 5G cell).

5G technologies can utilize beamforming techniques to improve base station transmission power and UE sensitivity reception. Beamforming can create a narrow beam, which concentrates the signal power in a much smaller region. A base station (gNB) can request a UE(s) location (e.g., GPS) to accurately create/design a beam that covers the desired area. 5G base stations can broadcast a locally unique cell identifier (physical cell identifier (PCI)), and/or a global cell identifier which is unique in the network. The global cell identifier can be defined as E-UTRAN Cell Global Identifier (ECGI) in 4G or new radio cell global identifier (NRCGI) in 5G. PCI range can be between 0 to 504 in 4G, and 5G has extended this range from 0 to 1007, and can be reused among base stations. 5G networks using beamforming techniques can yield to situations in which the cell coverage gets narrower and/or larger. Therefore, these beams can enter the coverage of other cells and create temporary cell relationships. These cell relationships can not be expected during network planning, and therefore can create PCI conflicts (e.g., confusion/collision), which can yield to handover failure. This issue can raise handover failure rate on large and dense 5G networks. The gNB can use a wide area coverage or reduce the coverage to a narrow beam to serve one or more UEs in the network. For example, when only one UE is connected to a specific cell, a coverage of several miles is not needed. However, if the beam is focused to that particular UE, then the network can provide better services, power, and resources to that particular UE.

Automatic neighbor relationships (ANR) can be a self-optimization feature to dynamically build and maintain optimal neighbor lists for each cell in real time. ANR can maintain optimal neighbor lists per cell by identifying missing neighbors, unused cells and automatically reconfiguring, without user intervention, based on UE reporting signal strength from neighboring cells. This can increase the number of successful handovers and facilitate a reduction in dropped connections due to missing neighbor relations. It can also minimize the manual handling of neighbor relations when establishing new eNBs and when optimizing neighbor lists. Consequently, ANR can automatically adapt to a changing network topology.

Neighbor relation tables (NRT) can be created, by a system self-organized network (SON) feature, based on distance (e.g., NRT of a given cell comprises all the cells within determine distance from it). The NRT can then be updated based on ANR functionalities. For example, if the UE discovers a new neighboring cell, an entry can be added in the NRT, or if there is no handover to a neighboring cell listed in the NRT, for a determined period of time, then an entry in the NRT can be deleted. After the ANR process is completed, source and target eNBs can share their corresponding NRT (comprising PCIs and/or frequency) via tunnels, which are added into their respective NRTs. The eNB can detect PCI confusion by identifying PCI duplication in its NRT. Thus, if PCI confusion is detected, then the PCI confusion can be resolved by updating one of the PCI values. Additionally, the NRT can be evaluated automatically and/or periodically by the network (e.g., eNB and/or SON), to identify and resolve PCI confusion.

This disclosure proposes a methodology for ANR for 5G networks using sporadic beamforming techniques. Additional steps and conditions can be added to the ANR and handover procedures. Machine-readable medium can be placed at the gNB and/or at a central core network location (e.g., SON and/or mobile edge compute (MEC) node).

A given cell can enable beamforming in a given direction to serve UE(s). For example, the gNB can request the cell to report its identity (e.g., PCI and/or NRCGI), and the location of the UE(s) that the beamforming is serving to the SON. Note that it is possible for the cell to have identified the UE location before beginning beamforming.

The gNB can receive the information and place the cell identity (e.g., PCI and/or NRCGI) in data structure (e.g., a temporal beamforming cell list). The SON can then estimate the location of the beam that the cell is generating and estimate the neighboring gNBs cells that may be affected by a narrow or longer beam. The SON can identify these cells by their PCI and/or NRCGI and place them in a second data structure (e.g., affected neighboring cell list).

When a UE detects a PCI of a given gNB through the ANR, the SON can compare the PCI against the temporal beamforming cell list. If this PCI exists in this list and the serving cell of this UE is in the affected neighboring cell list, then the SON can request the UE location (e.g., SON can mandate the serving cell to request the UE location). Based on the location, if the UE is highly likely to be located in the beam formed by the given cell, then the SON can apply a traditional ANR procedure and add additional steps as noted next. First, the SON can mandate that the ANR treat (e.g., label) the entry as a newly discovered cell (even if this PCI already exist in neighboring cell list). Based on the ANR rules specified by the 3GPP, the UE can send the NRCGI of the discovered cell to the ANR, and the SON can treat this entry as a temporary beamforming cell relationship. The SON can further facilitate the ANR to add an extra field in neighbor list to identify this cell relationship, (e.g., "TemporallyBeamformingCellRelationship"=TRUE). Thus, the ANR can identify that this new cell is not the same cell that already exists in the neighbor list.

Additionally, the SON can mandate that the ANR to use a timer (e.g., "TemporalToPermanentRelationshipTimer") for the relationship (e.g., TemporallyBeamformingCellRelationship"). If this relationship has not been used again after the timer expires, then the entry can be deleted from neighbor list. Consequently, UE's can use this relationship for handover as long as the correct PCI for handover can be distinguished and the entry is present in neighbor list. Conversely, the timer can equal 0, which can imply that the cell relationship can not be added to the neighbor list, and therefore no PCI conflicts.

When an operator develops a network, each cell can have an identification (ID). The ID can be the PCI and/or an NRCGI. The PCI is not unique and there can be a predetermined number of PCI numbers. However, the NRCGI is unique and there can only be one number per cell. When the UE is scanning for neighbors, the UE can report the PCI of neighbors. The eNB can then resolve the NRCGI based on the PCI by querying a database. When the NRCGI is identified, the source and the destination cells can create a data and control tunnel and establish a handover. However, if one cell has multiple neighbors with the same PCI, then a conflict can occur. The first time the cell establishes a relationship with the one cell and gives a specific PCI and NRCGI, the cell can store this data in a database. Consequently, when a UE comes into the picture, the cell can access the old data in the database. However, if a second cell comes with the same PCI, then a cell in the middle can become confused and the middle cell cannot know whether to make the handover to the cell to the right or the cell on the left. Thus, to reduce conflicts, in a SON, PCI numbers can be selected on a per cell basis based on the distance of the cells in relation to each other.

5G has improved location position accuracy (e.g., 1 meter) which can be used for more accurate UE location. Uplink pilot signals can be used for UE position determination (location). Additionally, this system can work indoors and facilitate lower UE power requirements, etc. Machine learning can also be used at the gNB, SON, and/or MEC to perform specific functions of this system. The aforementioned algorithm can be hosted at an eNB, a computer, a SON, device (e.g., device can act as a controller of other devices for the eNB), and/or system that can collect data and react based on the data.

In one embodiment, described herein is a method comprising detecting, by a mobile device comprising a processor, a first neighboring cell base station device of a wireless network. In response to the detecting the first neighboring cell base station device, the method can comprise reporting, by the mobile device, the first neighboring cell base station device to a serving cell base station device of the wireless network. Additionally, based on a location of the mobile device, the method can comprise receiving, by the mobile device, a wireless signal from a second neighboring cell base station device. Furthermore, in response to a determination based on a comparison of the first neighboring cell base station device to a data structure of the serving cell base station device and in response to the receiving the wireless signal, the method can comprise receiving, by the mobile device, a prompt to report the second neighboring cell base station device to the serving cell base station device, wherein the second neighboring cell base station device is different from the first neighboring cell base station device, and wherein identity data of the second neighboring cell base station device is a same identity data of the first neighboring cell base station device.

According to another embodiment, a system can facilitate, receiving, from a mobile device, first neighboring base station data representative of a first neighboring base station device in relation to a serving base station device of the mobile device. In response to a condition associated with the first neighboring base station device being determined to have been satisfied, the system can comprise sending request data representative of a request for additional first neighboring base station device data to the mobile device. Furthermore, in response to receiving the additional first neighboring base station device data from the mobile device, the system can comprise establishing a data tunnel communication between the serving base station device and the first neighboring base station device. Additionally, in response to the establishing the data tunnel communication, the system can comprise storing the additional first neighboring base station device data in a data store of the serving base station device.

According to yet another embodiment, described herein is a machine-readable storage medium that can perform the operations comprising, receiving, by a serving base station device, first identity data of a first neighbor base station device based on a location of a mobile device. In response to the receiving the first identity data, the machine-readable storage medium can perform the operations comprising adding the first identity data to a data structure of the serving base station device. The machine-readable storage medium can perform the operations comprising receiving an indication that the mobile device has received a beamforming signal from a second neighbor base station device different than the first neighbor base station device. Furthermore, the machine-readable storage medium can perform the operations comprising comparing the first identity data of the first neighbor base station device to second identity data of the second neighbor base station device. Additionally, in response to a condition associated with the comparing being determined to have been satisfied, the machine-readable storage medium can perform the operations comprising facilitating a handover of the mobile device from the serving base station device to the first neighbor base station device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.)

supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
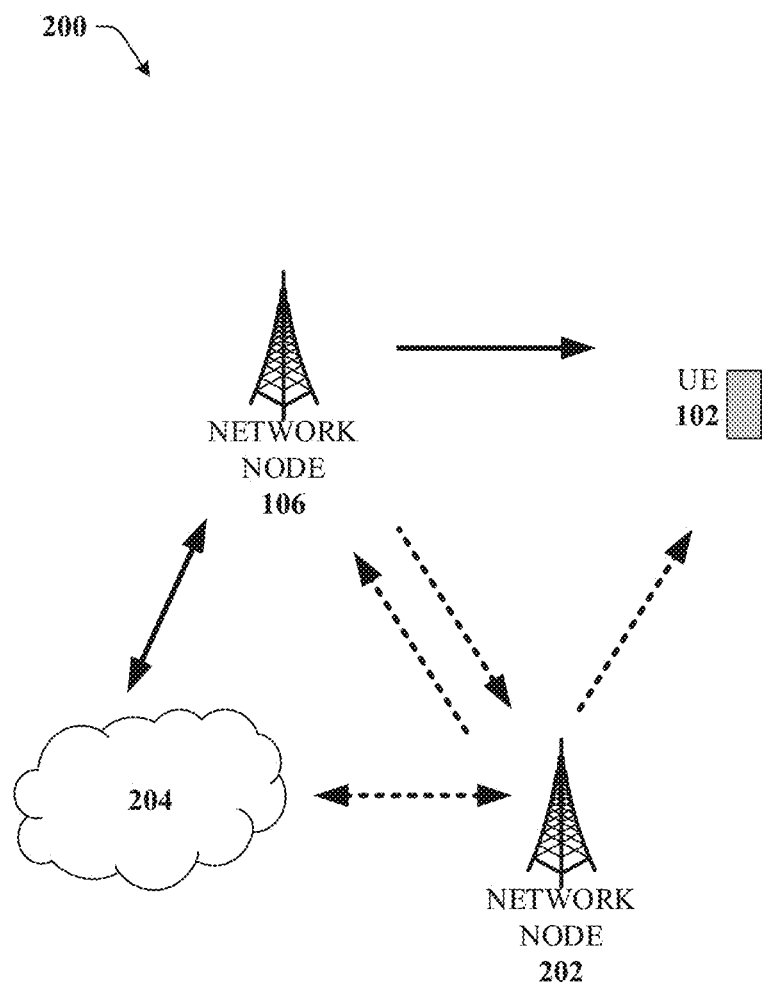
FIG. 2 illustrates an example schematic system block diagram of an automatic network relation system according to one or more embodiments.

Referring now to FIG. 2, illustrated is an example schematic system block diagram of an automatic network relation system. FIG. 2 depicts an automatic network relation (ANR) mechanism to dynamically build and maintain optimal neighbor lists for each cell in real time. The UE 102 can be used to detect and report neighboring cells (e.g., network node 202) to the serving cell 106. Reported neighboring cells (e.g., network node 202) can be identified by PCI. If the reported neighbor cell (e.g., network node 202) is not in the neighboring list (NL) of the serving cell (e.g., network node 106), then UE 102 can be asked to read and report additional cell information (ECGI or NRCGI) on the neighbor cell (e.g., network node 202). The servicing cell (e.g., network node 106) can then request the IP address of neighboring cell (e.g., network node 202) to be sent to an element management system (EMS) to establish an X2 tunnel between the servicing cell (e.g., network node 106) and the neighboring cell (e.g., network node 202). Consequently, subsequent UEs can only report PCI. Then, the serving cell (e.g., network node 106) can begin the handover to the neighboring cell (e.g., network node 202) using the established PCI/X2-tunnel table.

Figure 3:
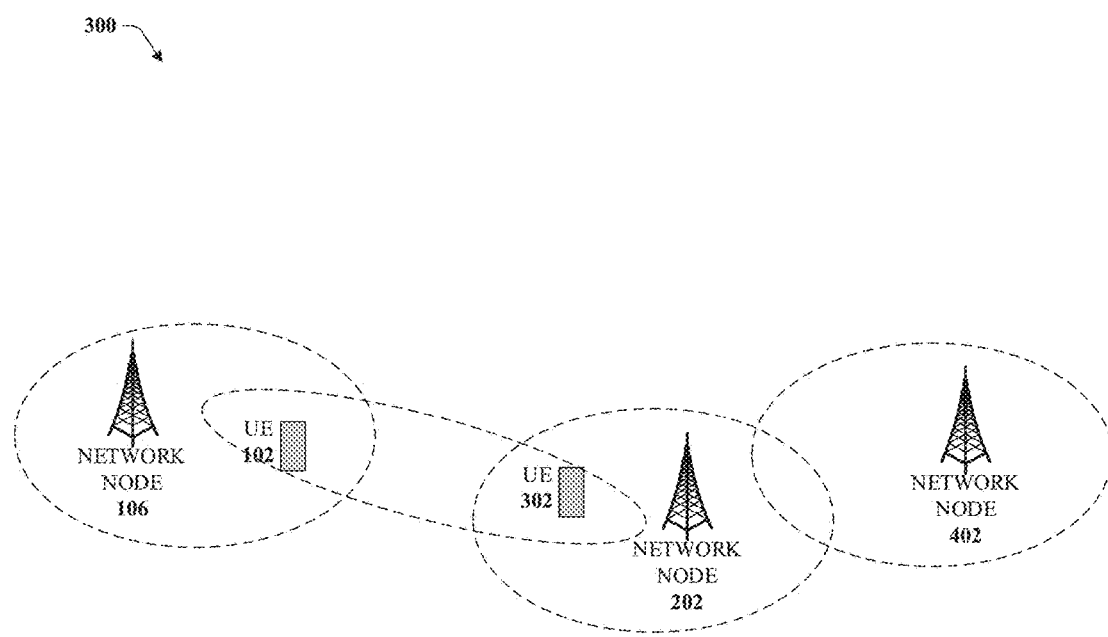
FIG. 3 illustrates an example schematic system block diagram of an example of physical cell identifier confusion according to one or more embodiments.

Referring now to FIG. 3, illustrated is an example schematic system block diagram of physical cell identifier confusion. A cell (e.g., network node 106) can create a narrow beam so that the UE 102 can receive more power, but then a UE 302 can receive coverage from another cell, where network 106 has engaged into beamforming), which was originally far aware from the original cell (e.g., network node 106). For example, the network node 106 can enable beamforming (narrow beam) to focuses its transmitting signal power in the direction of the UE 102. As a result, the narrow/longer beam can penetrate the network node 202 cell coverage.

Thus, this scenario creates a conflict because two cells (e.g., network node 106 and network node 202) are now becoming neighbors where they were not assigned that way initially. Network node 106, with PCI X, has engaged in beamforming to provide better service to UE 102. As a consequence, coverage of network node 106 has changed into a longer narrow beam, which now penetrates into coverage of network node 202. Network node 402 has also PCI X. Network node 402 and network node 202 are neighbors and have been assigned that way from the initial stage of the network design. Network node 202 now has two neighbors with the same PCI value, which can yield to PCI conflict and handover failure. As an example, UE 302, which is connected to network node 202, can try to handover to the PCI X on the left (network node 106). Servicing cell (network node 202) can use an existing NL table and cell relationship of the PCI X on the right (network node 402), which can yield to handover to the wrong cell and therefore handover failure.

As previously mentioned, PCIs can be used in the LTE network as a way for UE 302 to distinguish between different cells. The available numbers of PCIs are 504 for LTE and 1008 for 5G. 4G/5G networks can contain a much larger number of cells. Thus, the same PCI must be used by several cells. However, UE 302 cannot distinguish between two cells if they have the same PCI and the same frequency. This scenario can give rise to PCI confusion, which is when the UE 302 in a cell can hear two different neighbor cells (e.g., network node 106 and network node 402) with the same PCI and frequency, while connected to network node 202.

In case of a handover, the intermediate cell (e.g., network node 202) may not be able to determine the right destination between the network node 106 and the network node 402. Thus, if it is assumed that the network nodes 106, 402 have the same PCI, then there can be PCI confusion and the network node 202 can be confused and become a victim of this confusion. Consequently, when a handover is needed, then the network node 202 may not be able to choose the correct destination for the UE 302 communication to be handed over.

UE 302 is connected to network node 202. When ANR is enabled in the network node 202, the UE 302 can detect the network node 106 signal power, and follow the ANR procedure to report the cell identity to the network node 202. Since, the PCI of network node 106 (PCI X) already exists in the neighboring list of the network node 202, then no changes can be made in the neighboring list of the network node 202. Thus, when the UE 302 requests handover to the network node 106, the network node 202 can use the stored cell information of the network node 402, which can yield to PCI confusion and prompt handover failure.

Figure 4:
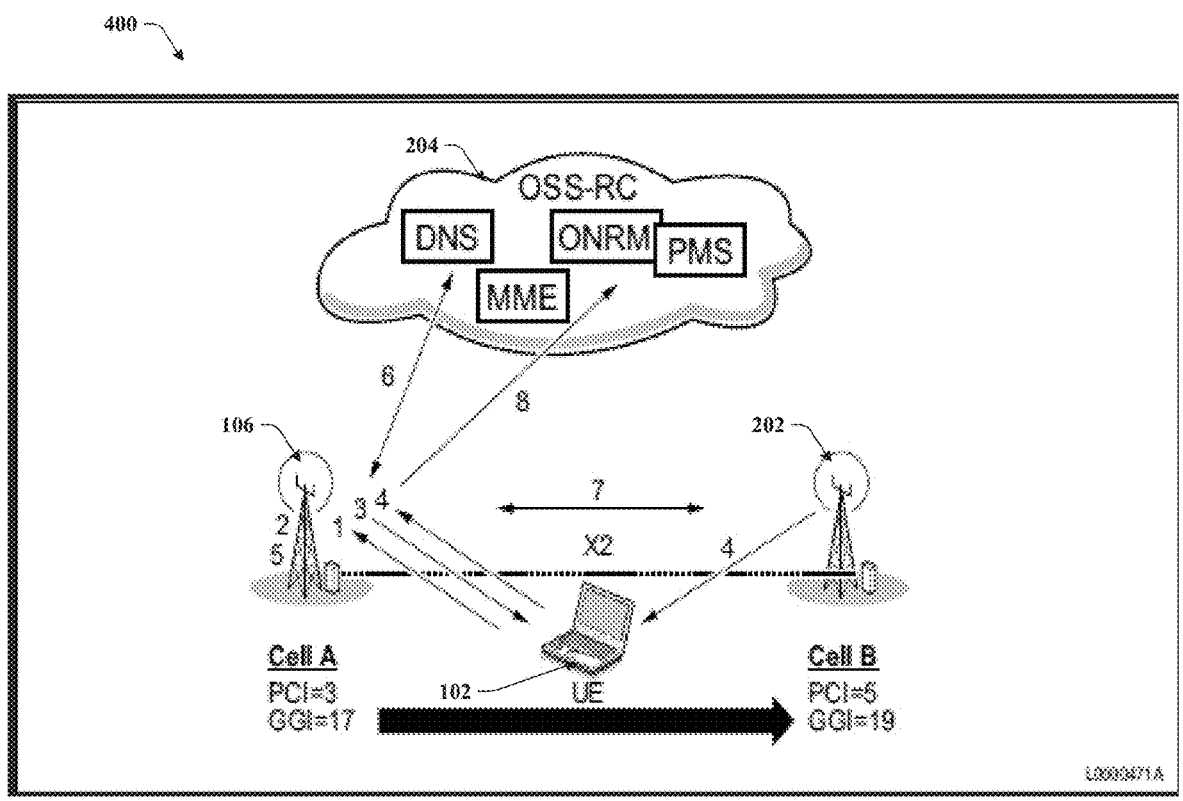
FIG. 4 illustrates an example schematic system block diagram of an automatic neighbor relationship according to one or more embodiments.

Referring now to FIG. 4, illustrated is an example schematic system block diagram of an automatic relationship. At step 1, FIG. 4 depicts the UE 102 reporting a neighbor measurement (e.g., PCI=5) to source cell (e.g., network node 106). The source cell can determine that PCI=5 is not known at step 2, and the source cell can instruct the UE 102 to read the ECGI for the destination cell (e.g., 402) at step 3. At step 4, the UE 102 can read the ECGI and report ECGI broadcast for the destination cell. Thereafter, at step 5, the source cell can determine the IP address of the ECGI=19 is not known. Thus, the source cell can send a request of the IP address of ECGI=19 to a DNS at step 6. At step 7, the source cell can receive the IP address of the destination cell from the MME/DNS and establish an X2 channel at step 8. At step 9, the source cell can update the EMS prior to the handover taking place at step 10. It should be noted that the EGCI is unique number per eNB throughout the network with same PLMN. However, the PCI can be reused throughout the network as long as coverage of cells with identical PCIs do not overlap. The UE 102 can read PCI data from a master information block (MIB) message and decode the ECGI from a SIB1 message. Thus, the UE can spend less time/energy reading PCI than decoding ECGI. The ANR can ask the UE 102 to report the PCI instead of ECGI to optimize UE battery. If the PCI does not exist in NL, then the UE 102 can report the ECGI.

Figure 5:
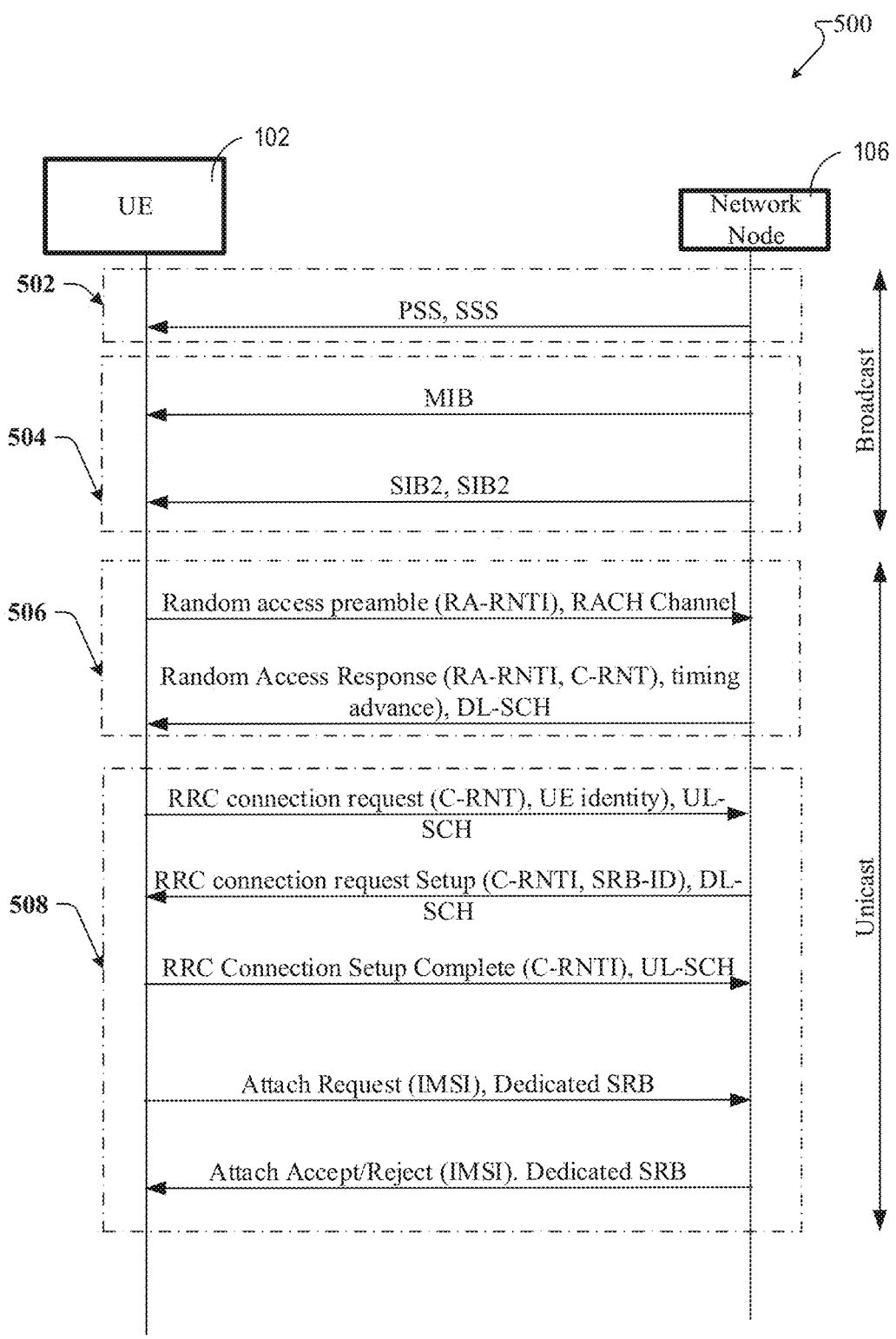
FIG. 5 illustrates an example schematic system block diagram of a cell selection and attach process according to one or more embodiments.

Referring now to FIG. 5 illustrates an example schematic system block diagram of a cell selection and attach process. At communication 502, the eNB 106 can initiate a broadcast process by process by sending synchronization data (e.g., PSS and SSS) to the UE 102. Additionally, as a part of the broadcast process, at communication 504, the eNB 106 can send system information data (e.g., MIB, SIB1, SIB2, etc.) to the UE 102. In response to the broadcast data, and as the beginning of a unicast, the UE 102 can send random access preamble data (e.g., random access radio network temporary identifier (RA-RNTI)) or a random access channel as part of a random access procedure 506. In response to receiving the random access preamble data, the eNB 106 can send random access response data (e.g., RA-RNTI, cell-RNTI, timing advance, etc.) via a downlink channel as a part of the unicast. The unicast can also comprise the UE 102 sending radio resource channel (RRC) connection request data (e.g., C-RNTI, UE identity data) via an uplink channel of an attach and authentication procedure 508. The attach and authentication procedure 508 can also comprise the eNB 106 sending an RRC connection setup (e.g., C-RNTI, signaling radio bearer (SRB)-ID, etc.) via the downlink channel prior to the UE 102 sending an indication of the RRC connection setup being complete to the eNB 106 via an uplink channel. The UE 102 can then send attach request data (e.g., IMSI) to the eNB 106 via a dedicated SRB. The eNB 106 can then send attach accept or reject data (e.g., IMSI) to the UE 102 via the dedicated SRB.

Figure 6:
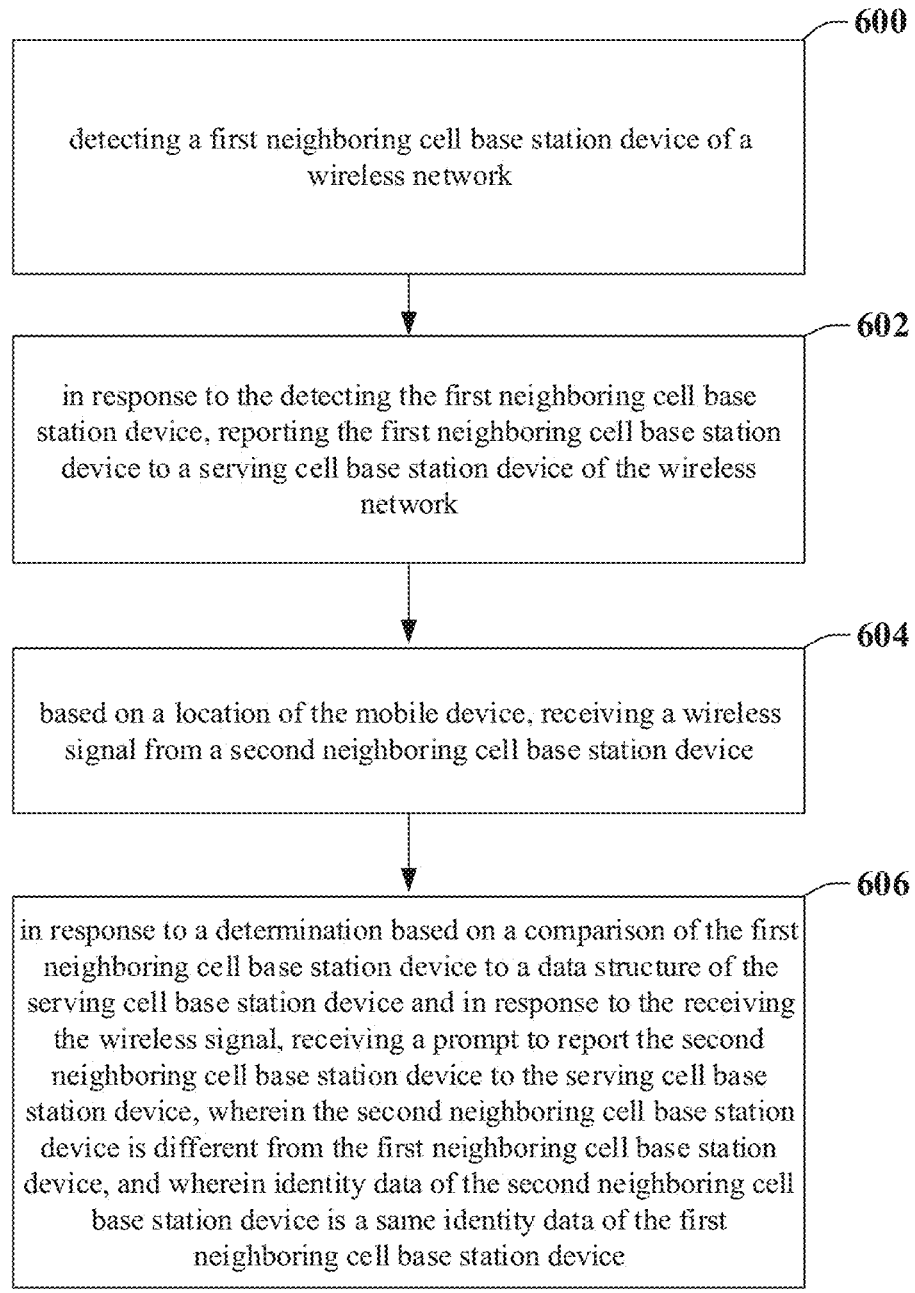
FIG. 6 illustrates an example flow diagram for a method for facilitating automatic neighbor relationships for a 5G network according to one or more embodiments.

Referring now to FIG. 6, illustrated is an example flow diagram for a method for facilitating automatic neighbor relationships for a 5G network according to one or more embodiments. At element 600, a method can comprise detecting a first neighboring cell base station device (e.g., network node 402) of a wireless network. In response to the detecting the first neighboring cell base station device (e.g., network node 402), the method can comprise reporting the first neighboring cell base station device (e.g., network node 402) to a serving cell base station device (e.g., network node 202) of the wireless network at element 602. Additionally, based on a location of the mobile device, at element 604, the method can comprise receiving a wireless signal from a second neighboring cell base station device (e.g., network node 106). In response to a determination based on a comparison of the first neighboring cell base station device (e.g., network node 402) to a data structure of the serving cell base station device (e.g., network node 202) and in response to the receiving the wireless signal, at element 606, the method can comprise receiving a prompt to report the second neighboring cell base station device (e.g., network node 106) to the serving cell base station device (e.g., network node 202), wherein the second neighboring cell base station device (e.g., network node 106) is different from the first neighboring cell base station device (e.g., network node 402), and wherein identity data of the second neighboring cell base station device (e.g., network node 106) is a same identity data of the first neighboring cell base station device (e.g., network node 402).

Figure 7:
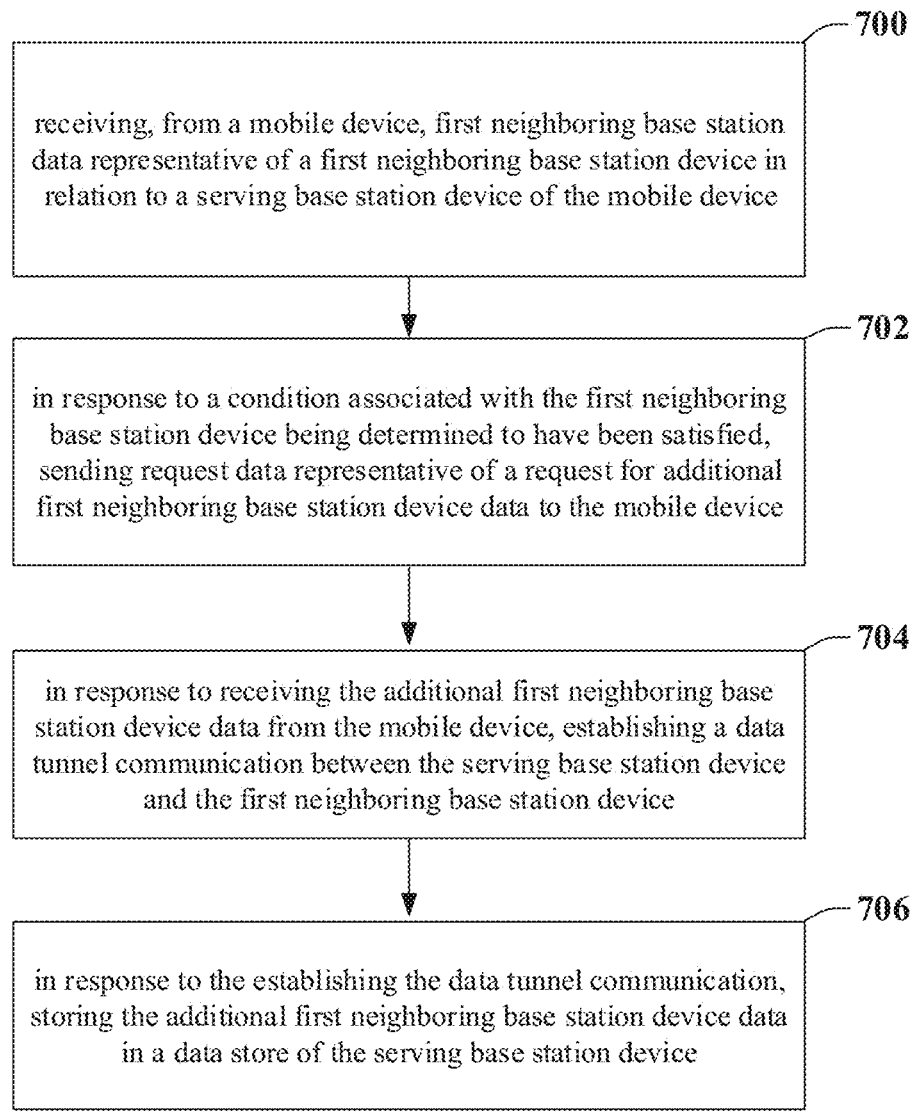
FIG. 7 illustrates an example flow diagram for system for facilitating automatic neighbor relationships for a 5G network according to one or more embodiments.

Referring now to FIG. 7, illustrated is an example flow diagram for system for facilitating automatic neighbor relationships for a 5G network according to one or more embodiments. According to another embodiment, at element 700, the system can facilitate, receiving, from a mobile device (e.g., UE 302), first neighboring base station data representative of a first neighboring base station device (e.g., network node 402) in relation to a serving base station device (e.g., network node 202) of the mobile device (e.g., UE 302). In response to a condition associated with the first neighboring base station device (e.g., network node 402) being determined to have been satisfied, at element 702, the system can comprise sending request data representative of a request for additional first neighboring base station device data to the mobile device (e.g., UE 302). Furthermore, in response to receiving the additional first neighboring base station device data from the mobile device (e.g., UE 302), at element 704, the system can comprise establishing a data tunnel communication between the serving base station device (e.g., network node 202) and the first neighboring base station device (e.g., network node 402). Additionally, in response to the establishing the data tunnel communication, at element 706, the system can comprise storing the additional first neighboring base station device data in a data store of the serving base station device (e.g., network node 202).

Figure 8:
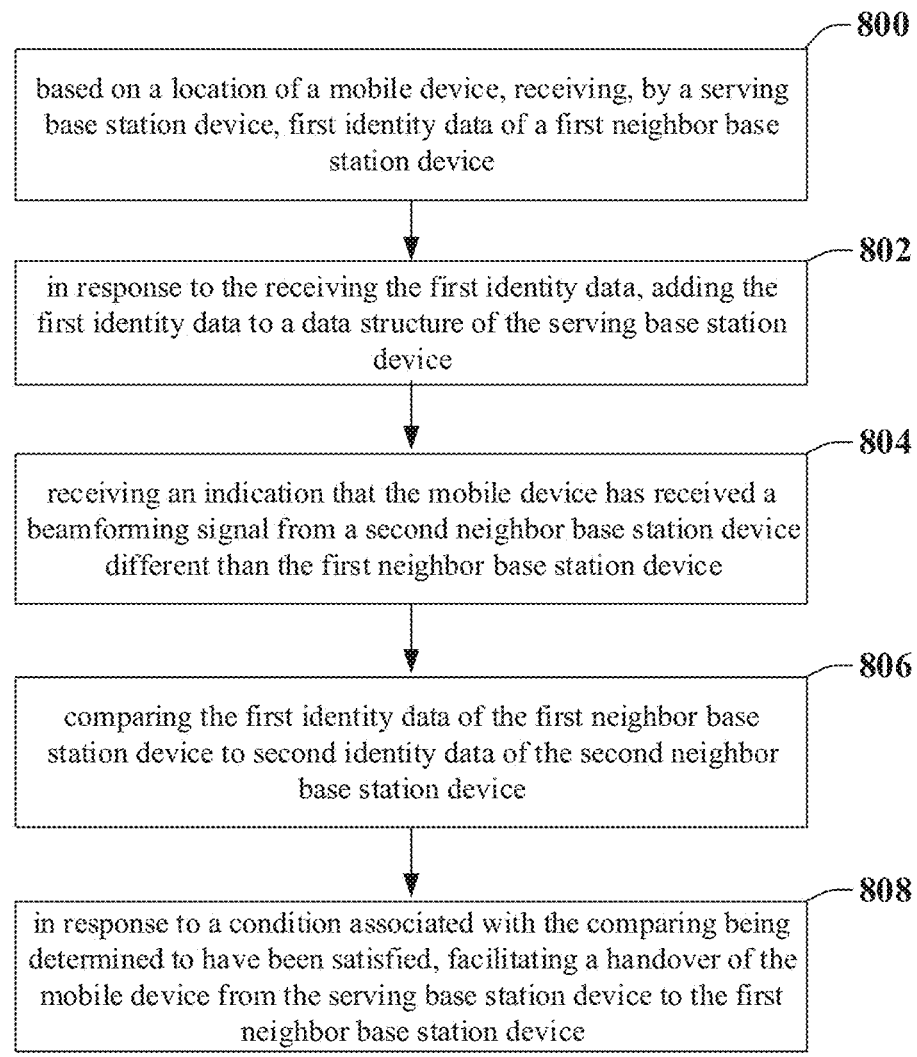
FIG. 8 illustrates an example flow diagram for a machine-readable medium for facilitating automatic neighbor relationships for a 5G network according to one or more embodiments.

Referring now to FIG. 8, illustrated is an example flow diagram for a machine-readable medium for facilitating automatic neighbor relationships for a 5G network according to one or more embodiments. At element 800, the machine-readable storage medium can perform the operations comprising, receiving, by a serving base station device (e.g., network node 202), first identity data of a first neighbor base station device (e.g., network node 402) based on a location of a mobile device (e.g., UE 302). In response to the receiving the first identity data, at element 802, the machine-readable storage medium can perform the operations comprising adding the first identity data to a data structure of the serving base station device (e.g., network node 202). At element 804, the machine-readable storage medium can perform the operations comprising receiving an indication that the mobile device (e.g., UE 302) has received a beamforming signal from a second neighbor base station device (e.g., network node 106) that is different than the first neighbor base station device (e.g., network node 202). Furthermore, at element 806, the machine-readable storage medium can perform the operations comprising comparing the first identity data of the first neighbor base station device (e.g., network node 402) to second identity data of the second neighbor base station device (e.g., network node 106). Additionally, at element 808, in response to a condition associated with the comparing being determined to have been satisfied, the machine-readable storage medium can perform the operations comprising facilitating a handover of the mobile device (e.g., UE 106) from the serving base station device (e.g., network node 202) to the first neighbor base station device (e.g., network node 402).

Figure 9:
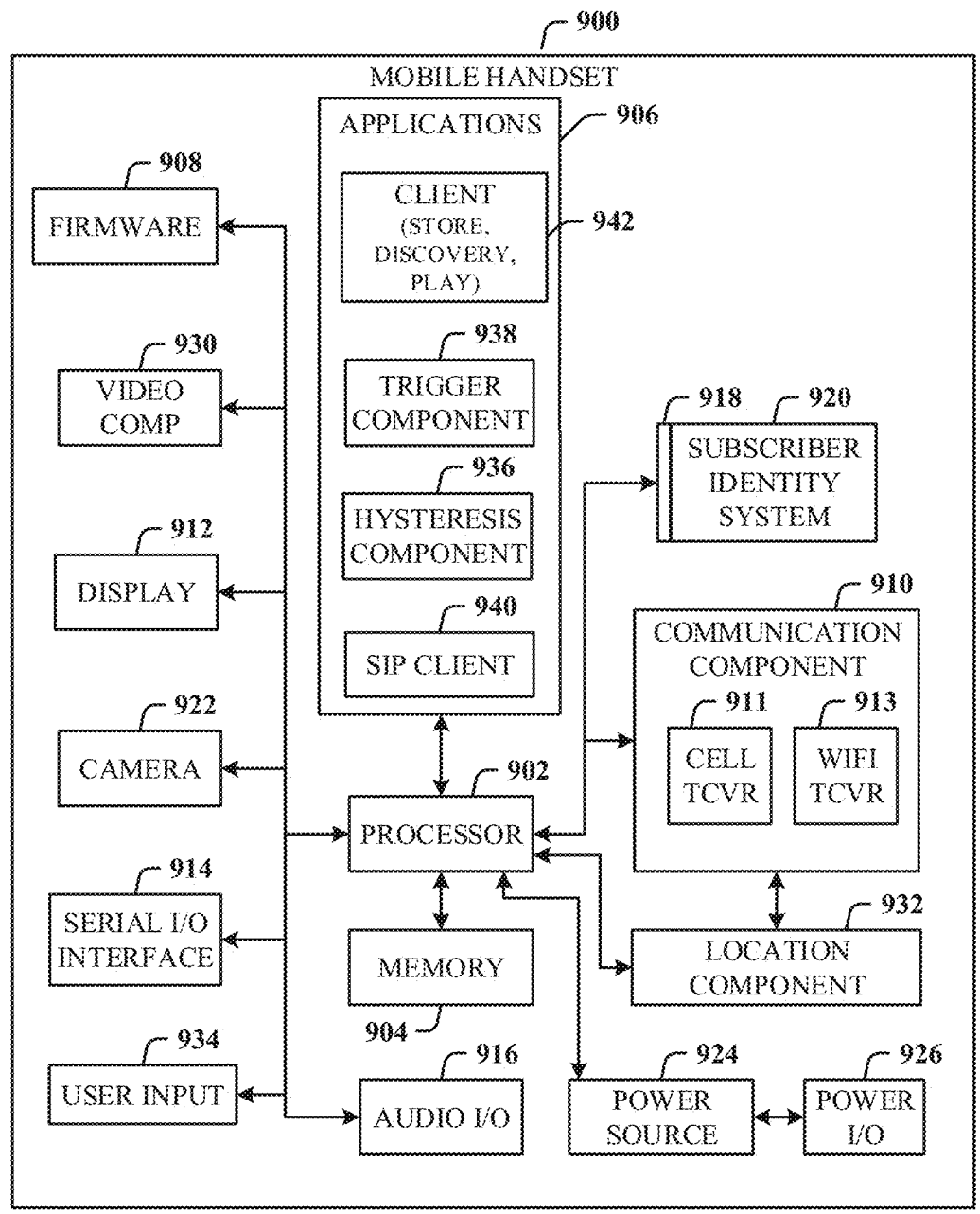
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
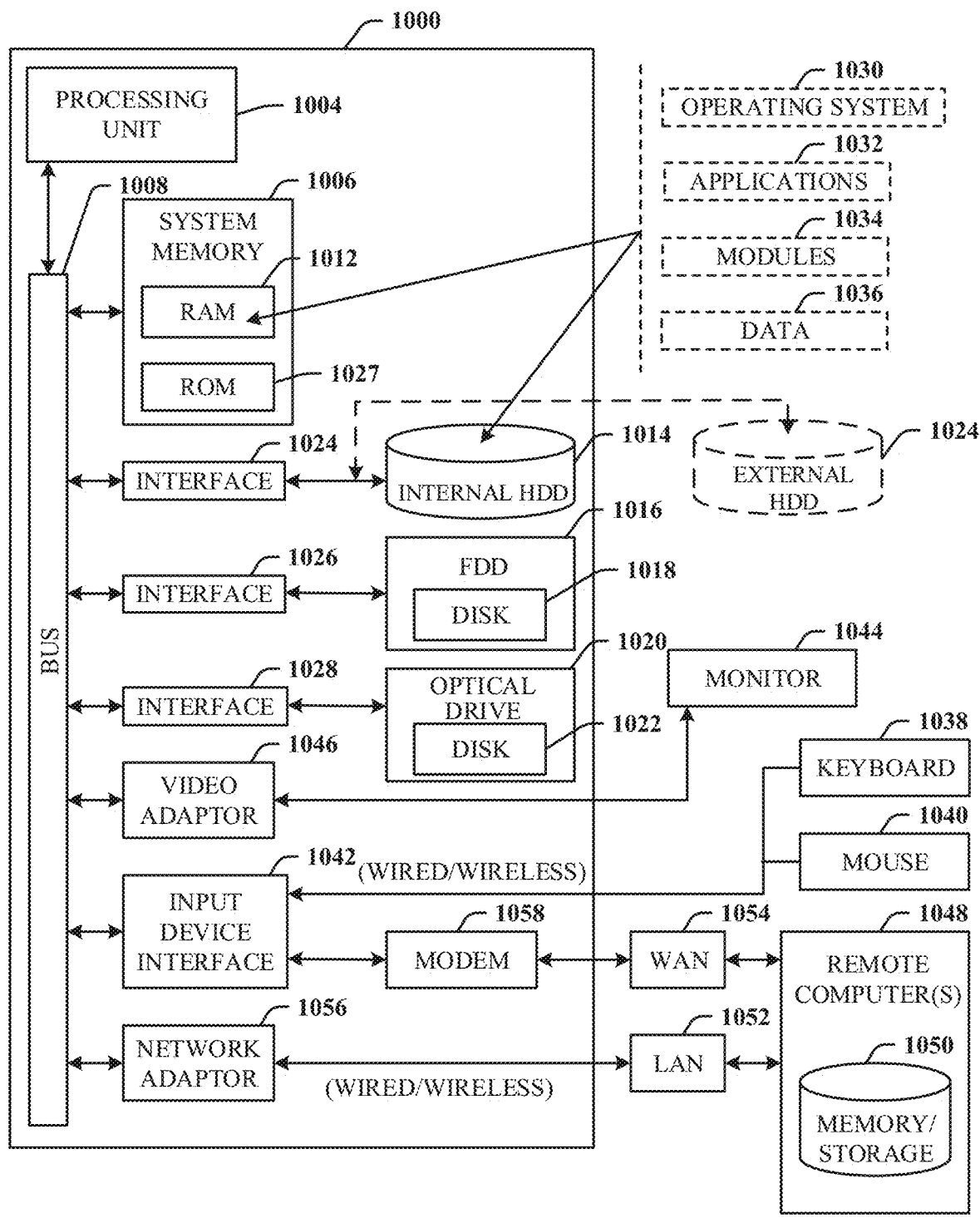
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system 204. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    detecting, by a user equipment comprising a processor, first neighboring cell base station equipment that is part of a network;
    in response to detecting the first neighboring cell base station equipment, reporting, by the user equipment, the first neighboring cell base station equipment to serving cell base station equipment that is part of the network;
    determining, by the user equipment, a location of the user equipment;
    based on the location of the user equipment, receiving, by the user equipment, a signal from second neighboring cell base station equipment; and
    in response to a determination based on a comparison of first data representative of the first neighboring cell base station equipment to second data representative of the serving cell base station equipment, wherein a data structure comprises the second data and neighboring list data representative of a group of neighboring cellular base station equipment that neighbor the serving cell base station equipment, and in further response to receiving the signal, receiving, by the user equipment, a prompt to report the second neighboring cell base station equipment to the serving cell base station equipment, wherein the second neighboring cell base station equipment is different from the first neighboring cell base station equipment, and wherein second identity data of the second neighboring cell base station equipment is same as first identity data of the first neighboring cell base station equipment.

2. The method of claim 1, labeling the second neighboring cell base station equipment as a new base station equipment not previously found in the data structure.

3. The method of claim 1, further comprising:
    receiving, by the user equipment, a request for an internet protocol address of the first neighboring cell base station equipment.

4. The method of claim 3, wherein reporting the first neighboring cell base station equipment comprises reporting physical cell identifier data as the identity data associated with the first neighboring cell base station equipment.

5. The method of claim 3, further comprising:
    in response to the request for the internet protocol address of the first neighboring cell base station equipment, facilitating, by the user equipment, establishing a tunnel between the serving cell base station equipment and the first neighboring cell base station equipment.

6. The method of claim 5, further comprising:
    in response to facilitating the establishing of the tunnel, performing, by the user equipment, a communication handover between the serving cell base station equipment and the first neighboring cell base station equipment.

7. The method of claim 3, wherein reporting of the first neighboring cell base station equipment comprises reporting local unique cell identifier data associated with the first neighboring cell base station equipment.

8. A system, comprising:
a processor; and
a memory that stores executable instructions that, when executed by the processor, facilitate performance of operations, comprising:
detecting first neighboring cell base station equipment associated with a network;
in response to detecting the first neighboring cell base station equipment, reporting the first neighboring cell base station equipment to serving cell base station equipment associated with the network;
determining a location associated with a user equipment;
based on the location associated with the user equipment, receiving a signal from second neighboring cell base station equipment; and
based on a result of a comparison between the first neighboring cell base station equipment and the serving cell base station equipment, wherein a data structure comprises serving cell base station data representative of the serving cell base station equipment and neighboring list data representative of a group of neighboring cellular base station equipment that neighbor the serving cell base station equipment, and in response to receiving the signal, receiving a prompt to report the second neighboring cell base station equipment to the serving cell base station equipment, wherein the second neighboring cell base station equipment is different from the first neighboring cell base station equipment, and wherein second identity data of the second neighboring cell base station equipment is identical to first identity data of the first neighboring cell base station equipment.

9. The system of claim 8, wherein the operations further comprise:
sending request data representative of a request for additional first neighboring cell base station equipment data to the user equipment, wherein the request is a first request, and wherein the request data comprises a second request data associated with the second neighboring cell base station equipment.

10. The system of claim 9, wherein the operations further comprise:
sending a request for an internet protocol address of the first neighboring cell base station equipment from the serving cell base station equipment.

11. The system of claim 10, wherein the request data comprises an instruction for the user equipment to send the additional neighboring cell base station data to the serving cell base station equipment.

12. The system of claim 11, wherein the operations further comprise:
establishing a data tunnel communication between the serving cell base station equipment and the first neighboring cell base station equipment.

13. The system of claim 12, wherein establishing the data tunnel communication between the serving cell base station equipment and the first neighboring cell base station equipment is performed in response to sending the request for the internet protocol address of the first neighboring cell base station equipment.

14. The system of claim 9, wherein the request data comprises an instruction for the user equipment to utilize a beam from the second cell neighboring base station equipment.

15. A machine-readable medium, comprising executable instructions that, when executed by a processor, facilitate performance of operations, comprising:
detecting a first neighboring cell base station;
in response to detecting the first neighboring cell base station, reporting the first neighboring cell base station to a serving cell base station;
obtaining a location of associated with a mobile device;
based on the location associated with the mobile device, receiving a signal from a second neighboring cell base station; and
in response to a determination based on a comparison of the serving cell base station, as represented in a data structure, to the first neighboring cell base station, wherein the data structure comprises neighboring list data representative of a group of neighboring cellular base stations that neighbor the serving cell base station, and in further response to receiving the signal, receiving a prompt to report the second neighboring cell base station to the serving cell base station, wherein the second neighboring cell base station is different from the first neighboring cell base station, and wherein the second neighboring cell base station has a same identification as the first neighboring cell base station.

16. The machine-readable medium of claim 15, wherein the operations further comprise:
in response to a condition being determined to have been satisfied, instructing that a handover of the mobile device be performed from the serving cell base station to the first neighbor cell base station.

17. The machine-readable medium of claim 16, wherein the condition is based on a result of determining, based on the location of the mobile device, that the mobile device is likely to be within a beam generated by the second neighbor cell base station device.

18. The machine-readable medium of claim 16, wherein the operations further comprise:
determining that the second neighboring cell base station has the same identification as the first neighboring cell base station based on a result of comparing first identity data of the first neighbor cell base station to second identity data of the second neighbor base station.

19. The machine-readable medium of claim 18, wherein the operations further comprise:
in response to a condition, associated with the result of comparing the first identity data to the second identity data, being determined to be present, labeling the second neighbor cell base station as a new base station not previously found in the data structure.

20. The machine-readable medium of claim 19, wherein the operations further comprise:
in response to labeling the second neighbor cell base station as the new base station, generating an additional field in the data structure to identify a relationship between the serving cell base station and the second neighbor cell base station.

* * * * *